(12) United States Patent
Katayama

(10) Patent No.: US 10,939,011 B2
(45) Date of Patent: Mar. 2, 2021

(54) IMAGE READING APPARATUS PROVIDED WITH GUIDE RAIL TO GUIDE IMAGE READING UNIT TO READ DOCUMENT AND FIX THE GUIDE RAIL WITH AN ADHESIVE

(71) Applicant: CANON FINETECH INC., Misato (JP)

(72) Inventor: Masayoshi Katayama, Kashiwa (JP)

(73) Assignee: Canon Finetech Nisca Inc., Saitama (JP)

( * ) Notice: Subject to any disclaimer, the term of this patent is extended or adjusted under 35 U.S.C. 154(b) by 46 days.

(21) Appl. No.: 14/571,956

(22) Filed: Dec. 16, 2014

(65) Prior Publication Data

US 2015/0181071 A1  Jun. 25, 2015

(30) Foreign Application Priority Data

Dec. 19, 2013  (JP) .............................. JP2013-263075

(51) Int. Cl.
*H04N 1/10* (2006.01)
*H04N 1/024* (2006.01)

(52) U.S. Cl.
CPC .......... *H04N 1/103* (2013.01); *H04N 1/1043* (2013.01); *H04N 1/024* (2013.01)

(58) Field of Classification Search
None
See application file for complete search history.

(56) References Cited

U.S. PATENT DOCUMENTS

| | | | |
|---|---|---|---|
| 6,154,294 A * | 11/2000 | Craig et al. .................. | 358/483 |
| 7,869,102 B2 | 1/2011 | Ohara et al. | |
| 2006/0158695 A1* | 7/2006 | Lee ........................ | G03B 27/52 |
| | | | 358/474 |
| 2009/0086008 A1* | 4/2009 | Hong ........................... | 347/225 |
| 2011/0181924 A1* | 7/2011 | Mui ..................... | H04N 1/1017 |
| | | | 358/497 |
| 2013/0057604 A1* | 3/2013 | Masunaga ................ | B41J 29/38 |
| | | | 347/6 |

FOREIGN PATENT DOCUMENTS

| | | | |
|---|---|---|---|
| JP | 11-153836 A | | 6/1999 |
| JP | 2001-83624 A | | 3/2001 |
| JP | 2003-177214 A | | 6/2003 |
| JP | 2006-039021 | * | 2/2006 |
| JP | 2006039021 | * | 2/2006 |
| JP | 2008-227971 A | | 9/2008 |

OTHER PUBLICATIONS

Machine translation of JP Pub 2001-083624 to Saitou Naho.*
Saitou Naho; "Image Reader"; JP Pub Date Mar. 2001; JPO; pp. 1-16.*
English language machine translation of JP Pub 2006-039021 to Hata Yoshihiro . . . , JP Pub Date Feb. 2006.*

(Continued)

*Primary Examiner* — Benny Q Tieu
*Assistant Examiner* — Haris Sabah
(74) *Attorney, Agent, or Firm* — Venable LLP

(57) ABSTRACT

An image reading apparatus, including: a guide rail configured to guide an image reading unit; and a fixing portion having configured to fix the guide rail with an adhesive.

8 Claims, 7 Drawing Sheets

(56) References Cited

OTHER PUBLICATIONS

Machine Translation in English of JP Pub 2001-083624 to Saitoh Naho.*
Machine Translation in English of JP Pub 2006-039021 to Hata Yoshihiro.*
Machine Translation in English of JP Pub 2001-083624 to Saitou Naho.*
Office Action dated Nov. 24, 2015, in Japanese Patent Application No. 2013-263075.

* cited by examiner

IMAGE READING APPARATUS PROVIDED WITH GUIDE RAIL TO GUIDE IMAGE READING UNIT TO READ DOCUMENT AND FIX THE GUIDE RAIL WITH AN ADHESIVE

BACKGROUND OF THE INVENTION

Field of the Invention

The present invention relates to an image reading apparatus configured to read an image of a document by moving an image reading unit along a guide rail, and to an image forming apparatus including the image reading apparatus.

Description of the Related Art

An image forming apparatus such as a copying machine and a printer is configured to form an image on a recording medium such as a sheet based on image information of a document which is read by an image reading apparatus. The image reading apparatus is generally configured to read an image of the document by moving, in a sub-scanning direction, an image reading unit extending in a main scanning direction (Japanese Patent Application Laid-Open No. 2001-83624).

FIG. 8A is a perspective view illustrating the inside of a case 100 of an image reading apparatus of Japanese Patent Application Laid-Open No. 2001-83624 in a state in which a platen glass is removed. FIG. 8B is a view illustrating a part of a cross section taken along the line VIIIB-VIIIB of FIG. 8A.

In the inside of the case 100, an image reading unit 101 is arranged so as to extend in the main scanning direction (direction indicated by the double-headed arrow K1), and a guide rail (guide shaft) 102 configured to guide a movement of the image reading unit 101 is arranged below the image reading unit 101.

The guide rail 102 is arranged so as to extend in the sub-scanning direction (direction indicated by the double-headed arrow K2), and both end portions of the guide rail 102 are supported by wall portions 103 and 104 of the case 100, respectively. At a middle portion of the guide rail 102, a through-hole (hole) 102a is formed so as to pass through the guide rail 102 in a vertical direction. A boss 107 is inserted into the through-hole 102a. The boss 107 is formed so as to project upward from a rib 106, which is formed upright on a bottom portion 105 of the case 100. This structure positions (determines the position of) the middle portion of the guide rail 102.

A slider 101a configured to slide on the guide rail 102 is provided on a back surface of the image reading unit 101. The movement of the image reading unit 101 in the sub-scanning direction is guided by the slider 101a. The image reading unit 101 reads an image of a document, which is placed with an image surface of the document facing downward on a platen glass (not shown) arranged above the case 100, while scanning the document in the main scanning direction and also in the sub-scanning direction. Image information obtained through the reading is transmitted to a control board 109 via a flat cable 108. Note that, the image reading unit 101 is moved in the sub-scanning direction by a drive apparatus including a motor 110, a pulley 111, and a wire 112.

According to the above-mentioned invention disclosed in Japanese Patent Application Laid-Open No. 2001-83624, however, the boss 107 provided on the case 100 is inserted from under into the through-hole 102a of the middle portion of the guide rail 102 so as to position the middle portion of the guide rail 102. Therefore, during the traveling of the image reading unit 101, the guide rail 102 may prevent vibration in the lateral direction (main scanning direction), but in order to prevent vibration in the vertical direction, it is required that a thick (high in strength) and hard-to-vibrate guide rail is used to secure the image reading accuracy.

SUMMARY OF THE INVENTION

The present invention provides an image reading apparatus in which a guide rail can be fixed with a simple structure having no through-hole formed in the guide rail, and vibrations can be prevented by even a thin guide rail to prevent the reduction in image reading accuracy. The present invention provides an image forming apparatus including the image reading apparatus.

According to an embodiment of the present invention, there is provided an image reading apparatus, comprising: a guide rail configured to guide an image reading unit; and a fixing portion configured to fix the guide rail with an adhesive.

According to another embodiment of the present invention, there is provided an image forming apparatus, comprising: the above-mentioned image reading apparatus; and an image forming portion configured to form an image on a recording material based on image information read by the image reading apparatus.

Further features of the present invention will become apparent from the following description of exemplary embodiments with reference to the attached drawings.

DESCRIPTION OF THE EMBODIMENTS

The embodiments of the present invention will now be described in detail with reference to the accompanying drawings.

An image reading apparatus 11 and an image forming apparatus 10 including the image reading apparatus according to the present invention will be described with reference to FIGS. 1 to 7. First, the image forming apparatus 10 will be described, and then the image reading apparatus 11 will be described.

[Image Forming Apparatus]

Figure 1:
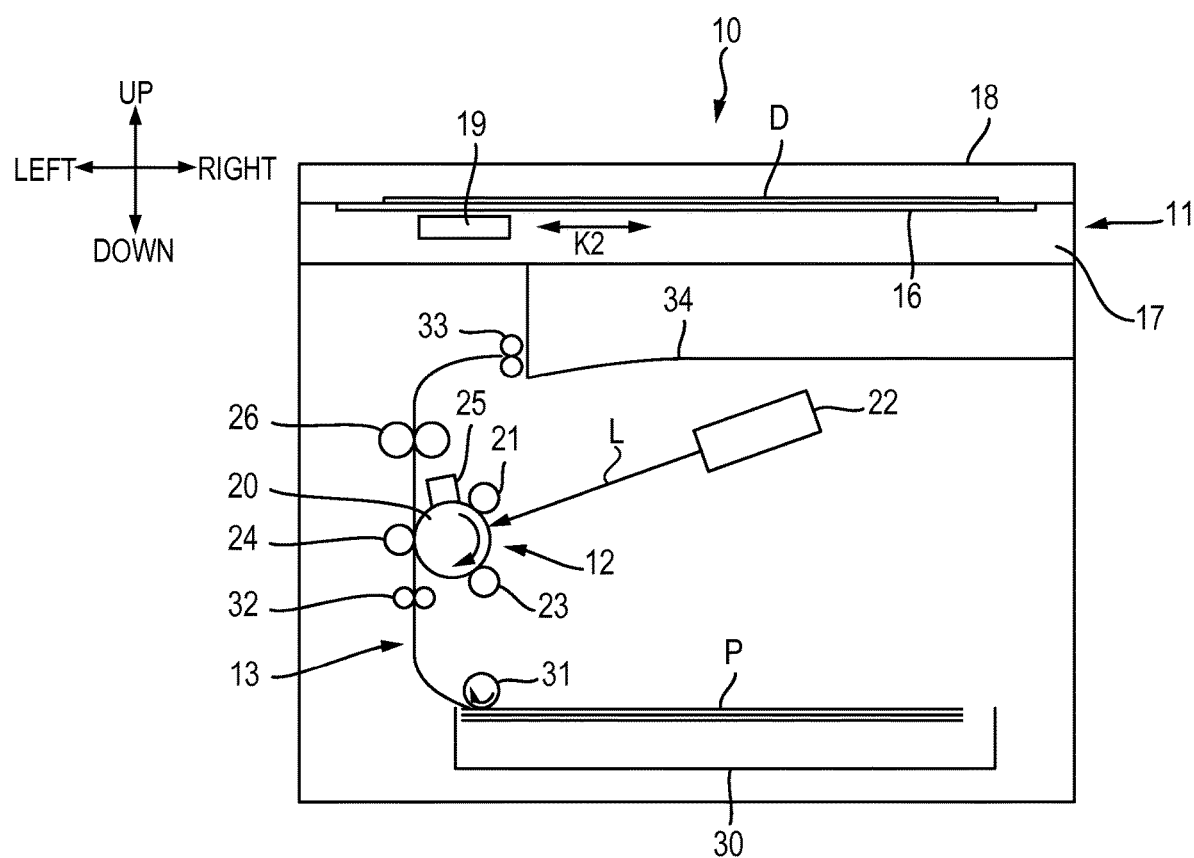
FIG. 1 is a schematic front view illustrating the inside of an image forming apparatus.

FIG. 1 is a schematic front view illustrating the inside of the image forming apparatus 10. For convenience of the following description, "up", "down", "right", "left", "front", and "back" indicated by the arrows on the left of FIGS. 1 to 3 correspond to an upward direction, a downward direction, a rightward direction, a leftward direction, a forward direction, and a backward direction of the image forming apparatus 10, respectively.

As illustrated in FIG. 1, the image forming apparatus 10 includes the image reading apparatus 11 configured to read an image of a document D; and an image forming portion 12 configured to form the image on a sheet (recording material) P based on image information read by the image reading apparatus 11. The image forming apparatus 10 includes a sheet feeding device 13 configured to convey the sheet P serving as the recording material into and out of the image forming portion 12.

The image reading apparatus 11 is arranged at an upper portion of the image forming apparatus 10, and includes a case 17 on top of which a transparent platen glass 16 is arranged, an openable and closable document pressing plate 18 configured to bring the document D into close contact with the platen glass 16, and an image reading unit 19. As described later, the image reading unit 19 extends in a main scanning direction (front-back direction: direction indicated by the double-headed arrow K1: see FIG. 3), and is movable (configured to travel) in a sub-scanning direction (right-and-left direction: direction indicated by the double-headed arrow K2). Note that, the image reading apparatus 11 will be described later in detail.

The image forming portion 12 includes a photosensitive drum 20 to be driven to rotate in a direction indicated by the arrow (in FIG. 1, a clockwise direction). A charging roller 21, a laser exposure unit 22, a developing roller 23, a transfer roller 24, and a cleaner 25 are arranged around the photosensitive drum 20 in the stated order in a rotation direction of the photosensitive drum 20. A fixing device 26 is arranged above the transfer roller 24. The surface of the photosensitive drum 20 is charged by the charging roller 21 so as to have a predetermined polarity and potential. On the charged surface of the photosensitive drum 20, an electrostatic latent image is formed by the laser exposure unit 22. The laser exposure unit 22 emits laser light L to be controlled ON and OFF based on image information of the document D which is read by the image reading apparatus 11, and exposes the surface of the photosensitive drum 20 with the laser light L to change the potential of the exposed portion. In this manner, the electrostatic latent image is formed.

Toner (developer) is caused to adhere to the electrostatic latent image by the developing roller 23 so that the electrostatic latent image is developed into a toner image. The toner image thus formed on the surface of the photosensitive drum 20 is transferred onto the sheet P by the transfer roller 24.

In this case, the sheet P is conveyed by the sheet feeding device 13 in synchronization with the toner image on the surface of the photosensitive drum 20. The sheet feeding device 13 includes a sheet feeding cassette in which a plurality of sheets P are contained in a stack, a pickup roller 31, a registration roller 32, a sheet delivery roller 33, and a sheet delivery tray 34. One of the sheets P in the sheet feeding cassette 30 is fed by the pickup roller 31, and is conveyed toward the registration roller 32. The conveyed sheet P is temporarily stopped by the registration roller 32 so that a skew feed of the sheet P is corrected.

The sheet P is fed to a transfer nip portion, which is formed between the photosensitive drum 20 and the transfer roller 24, in synchronization with the timing to convey the toner image on the photosensitive drum 20 to the transfer nip portion, and then the toner image is transferred onto the sheet P by the transfer roller 24.

The sheet P on which the toner image has been transferred is heated and pressurized by the fixing device 26 so that the toner image is fixed onto a front surface of the sheet P. Note that, after the toner image is transferred from the photosensitive drum 20, transfer residual toner remaining on the surface of the photosensitive drum 20 is removed by the cleaner 25 so that the photosensitive drum 20 is prepared for a subsequent image formation starting from the charging.

The sheet P to which the toner image has been fixed is delivered onto the sheet delivery tray 34 by the sheet delivery rollers 33. Through the above-mentioned process, the image formation for one surface (front surface) of a single sheet P is completed.

[Image Reading Apparatus]

Figure 2:
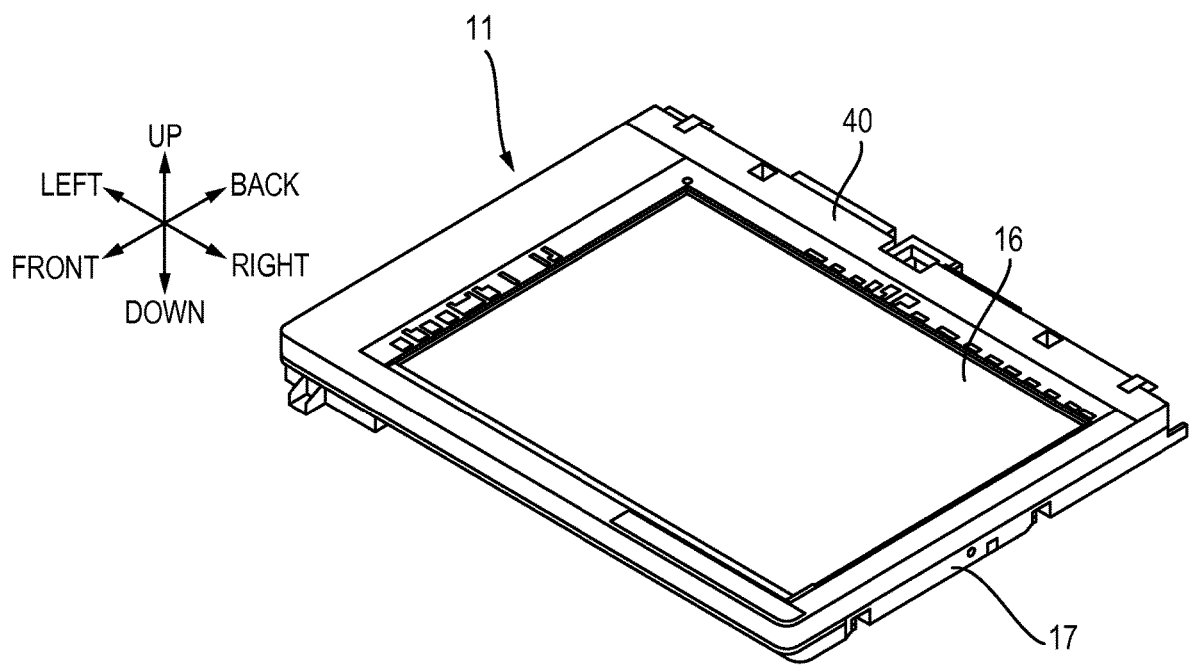
FIG. 2 is a perspective view illustrating an image reading apparatus in a state in which a document pressing plate is removed.
Figure 3:
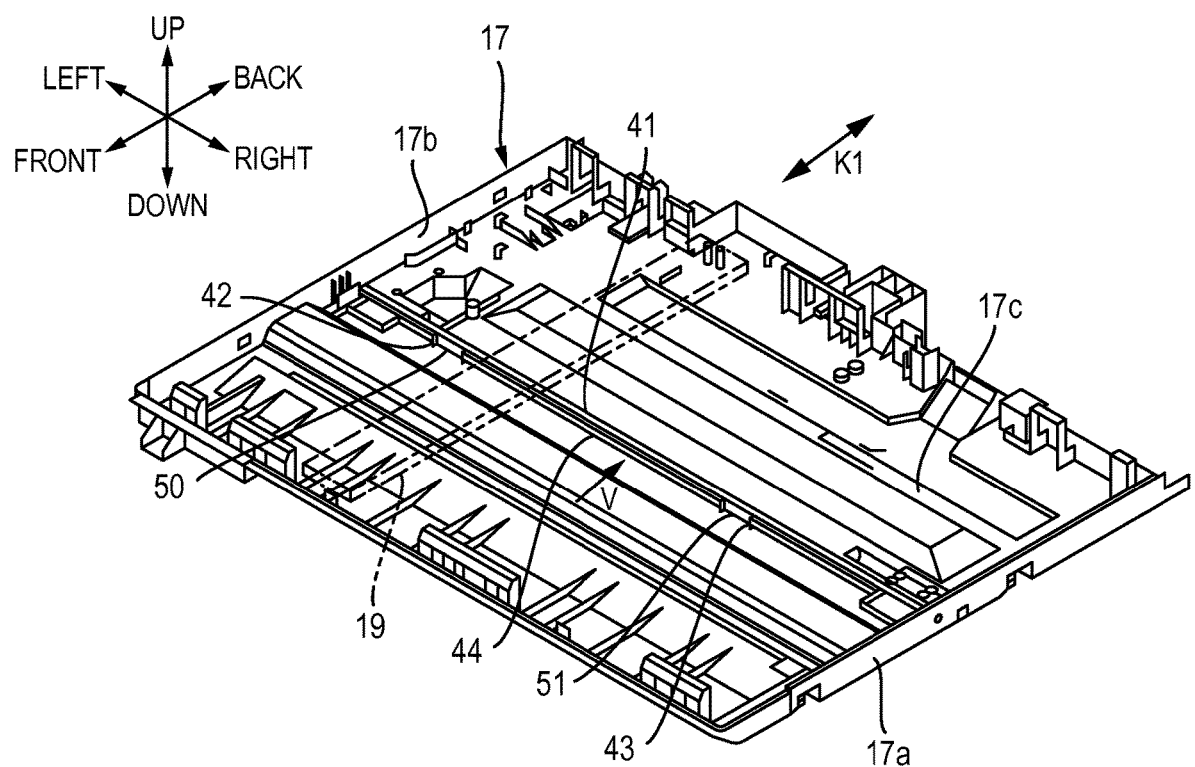
FIG. 3 is a perspective view illustrating a case and a guide rail of the image reading apparatus.
Figure 4:
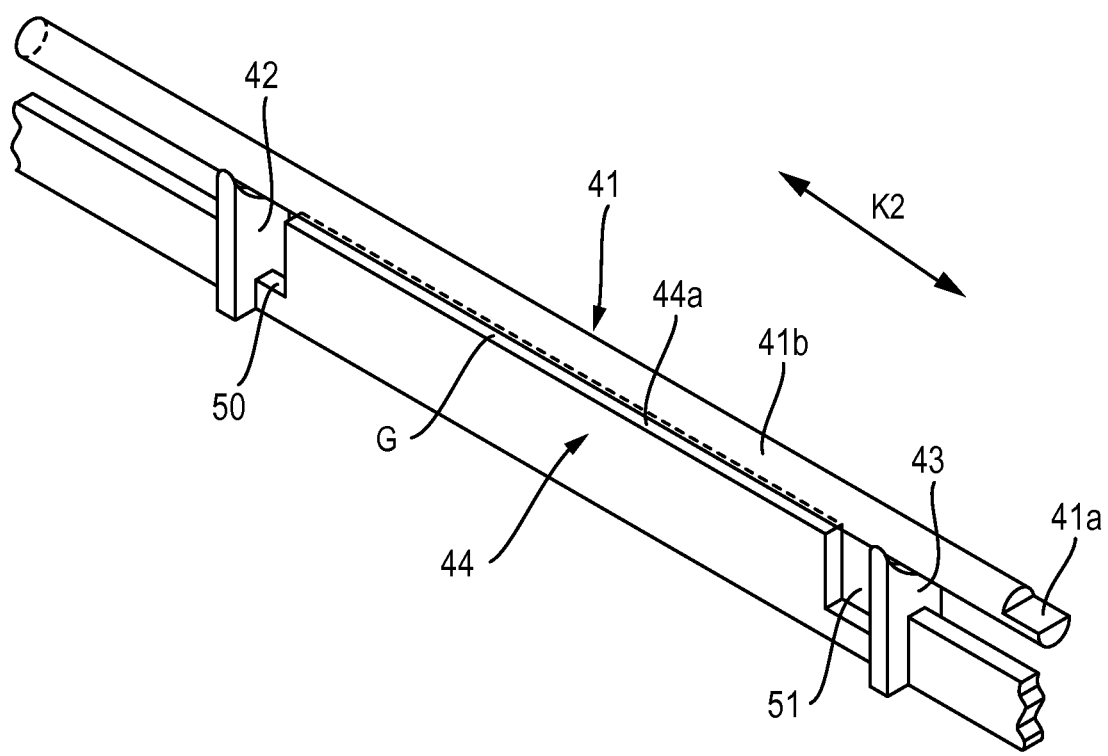
FIG. 4 is a schematic perspective view illustrating the guide rail, a pair of support portions, and a fixing portion.
Figure 5:
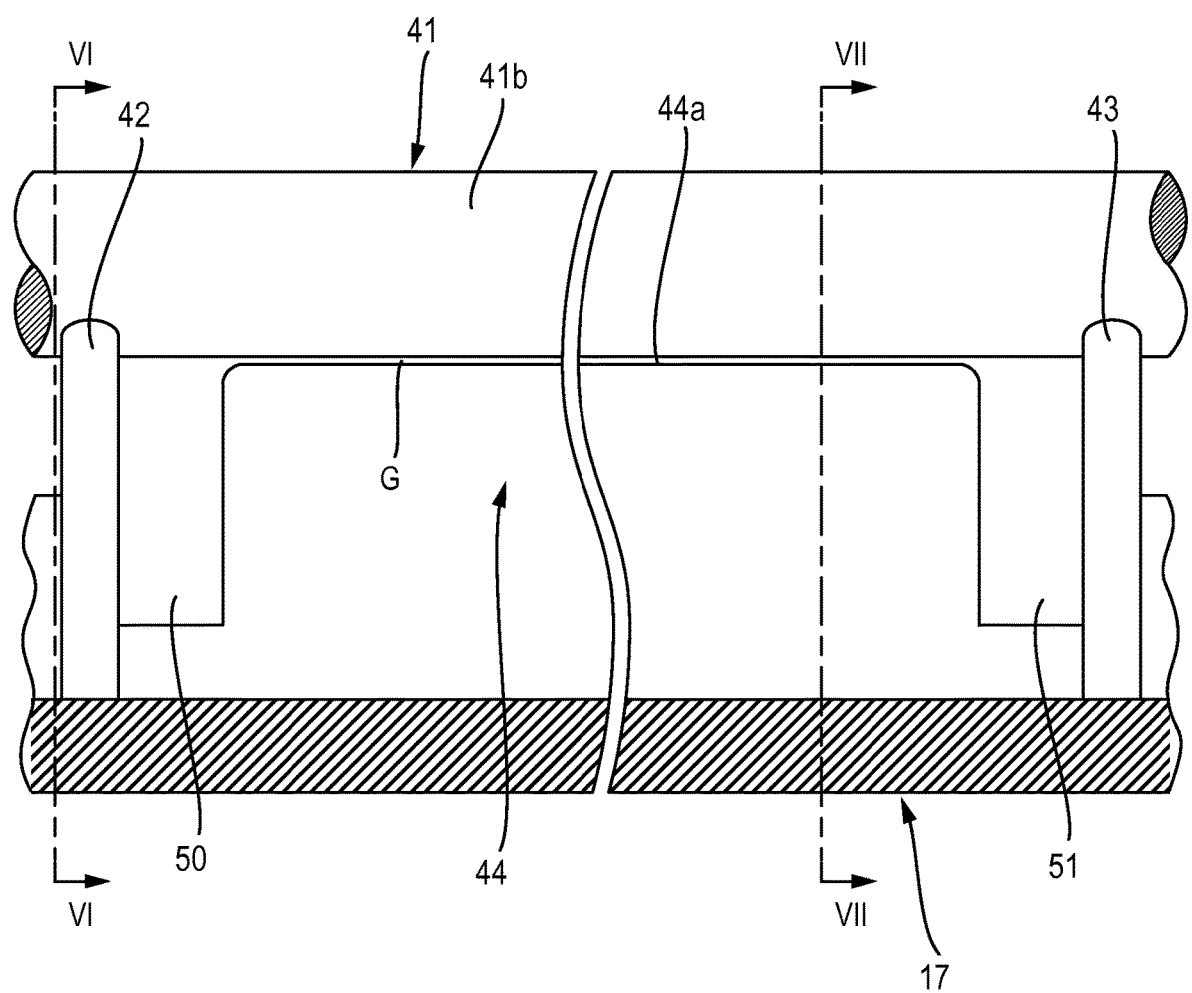
FIG. 5 is an enlarged view as seen in a direction indicated by the arrow V of FIG. 3.
Figure 6:
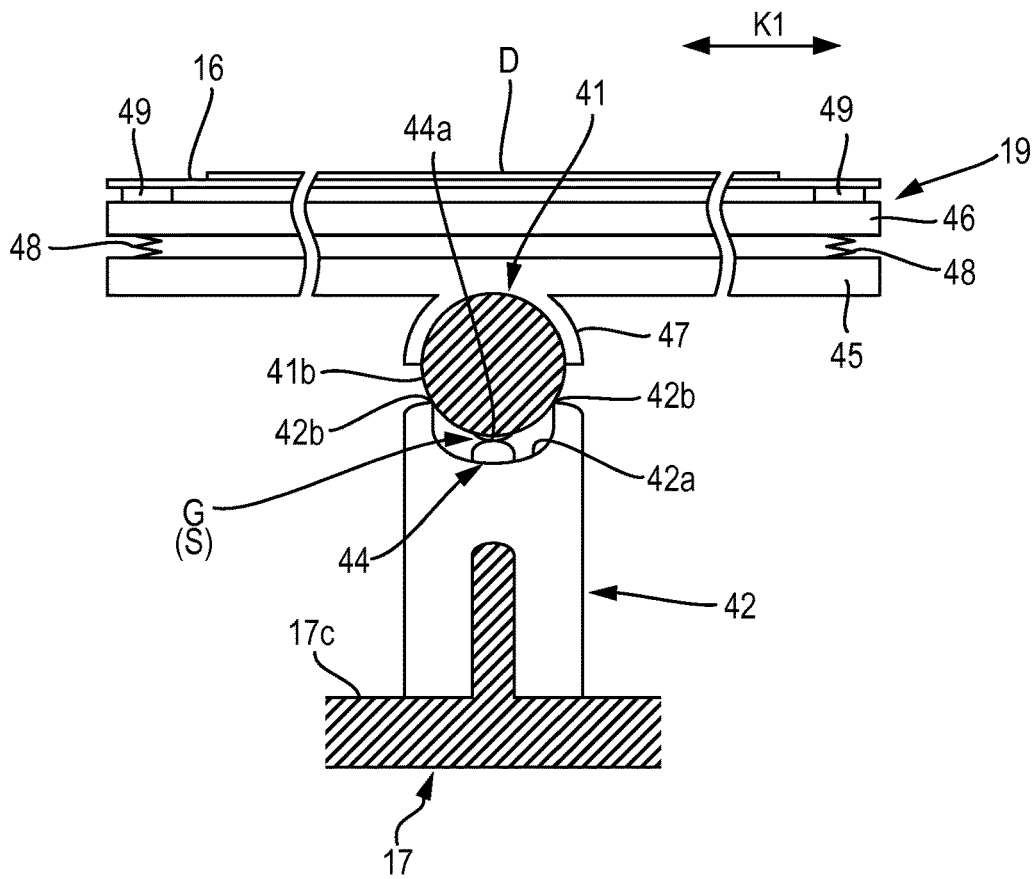
FIG. 6 is a sectional view taken along the line VI-VI of FIG. 5.
Figure 7:
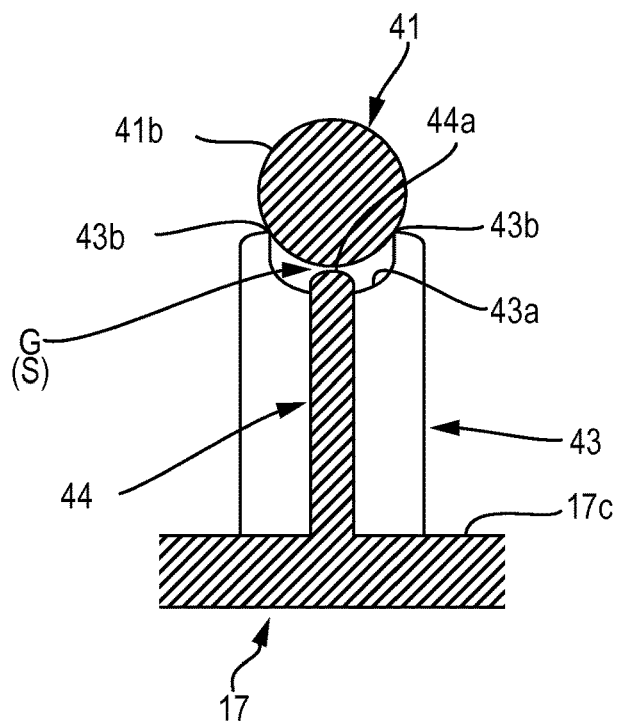
FIG. 7 is a sectional view taken along the line VII-VII of FIG. 5.
Figure 8A:
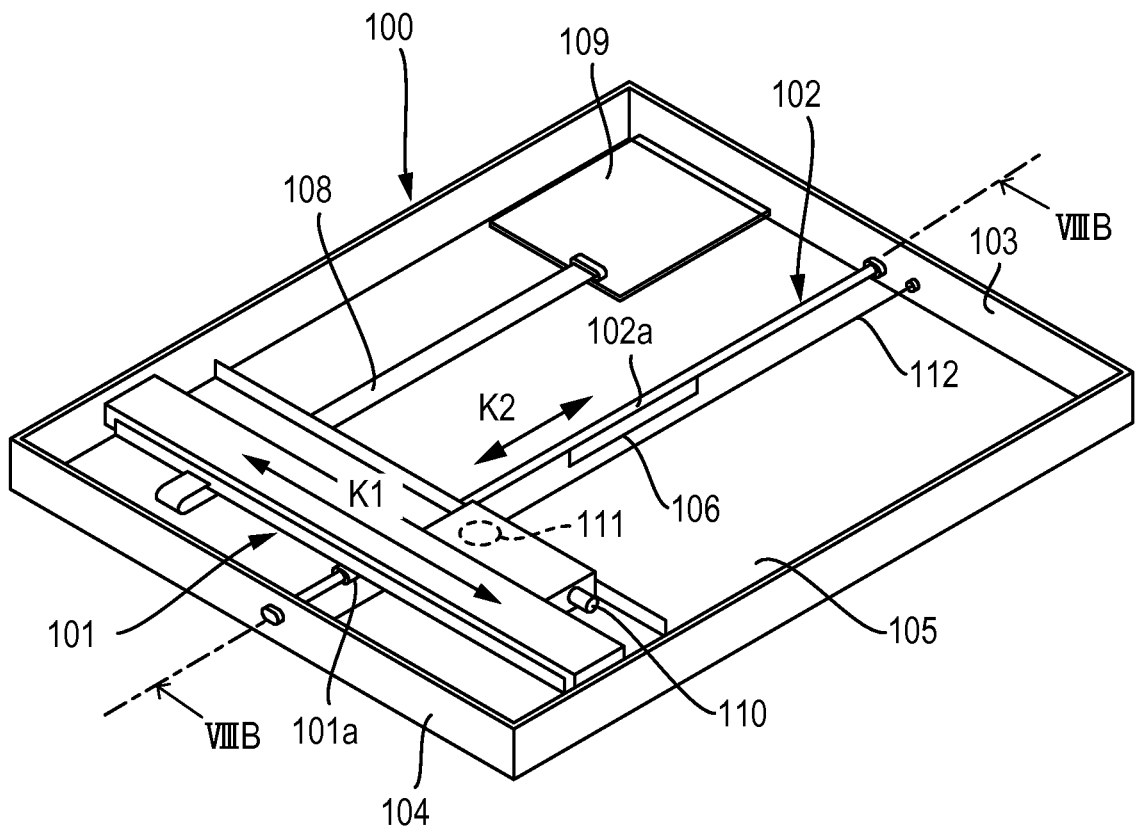
FIG. 8A is a perspective view illustrating the inside of a case of a conventional image reading apparatus in a state in which a platen glass is removed.
Figure 8B:
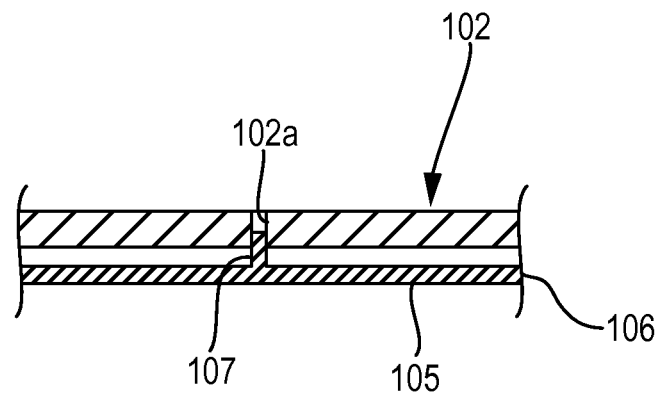
FIG. 8B is a view illustrating a part of a cross section taken along the line VIIIB-VIIIB of FIG. 8A.

FIG. 2 is a perspective view illustrating the image reading apparatus 11 in a state in which the document pressing plate 18 is removed. FIG. 3 is a perspective view illustrating the case 17 and a guide rail 41 of the image reading apparatus 11. FIG. 4 is a schematic perspective view illustrating the guide rail 41, a pair of positioning ribs (support portions) 42 and 43, and a bonding rib (fixing portion) 44. FIG. 5 is an enlarged view as seen in a direction indicated by the arrow V of FIG. 3. FIGS. 6 and 7 are sectional views taken along the lines VI-VI and VII-VII of FIG. 5, respectively. Note that, FIG. 6 additionally illustrates the image reading unit 19.

As illustrated in FIGS. 2 and 3, the image reading apparatus 11 includes the case 17. The case 17 includes a right wall portion 17a, a left wall portion 17b, and a bottom portion 17c. The top of the case 17 is covered with a frame 40 and the platen glass 16. As illustrated in FIG. 3, the image reading unit 19, the guide rail 41, the pair of positioning ribs (support portions) 42 and 43, and the bonding rib (fixing portion) 44 are provided inside the case 17. It is preferable that the positioning ribs 42 and 43 are arranged on both sides of the bonding rib 44 in the sub-scanning direction, respectively.

The image reading unit 19 is formed so as to extend in the main scanning direction (direction indicated by the double-headed arrow K1: front-back direction). As illustrated in FIG. 6, the image reading unit 19 includes a movement base 45 extending in the main scanning direction, and a line sensor 46 arranged above the movement base 45. A slider 47 movable along an upper half portion of the guide rail 41 is formed on a bottom surface of the movement base 45. It is preferable that the slider 47 be configured to receive the upper half portion of the guide rail 41. Compression springs (biasing members) 48 and 48 are arranged between the movement base 45 and the line sensor 46 at both end portions of the movement base 45 and the line sensor 46 in the main scanning direction, respectively. Spacers 49 and 49 are arranged on a top surface of the line sensor 46 at both the end portions in the main scanning direction, respectively. The line sensor 46 is biased upward by the movement base 45 through intermediation of the compression springs 48 and 48 so that the spacers 49 and 49 are brought into abutment against a back surface of the platen glass 16. Thus, a constant distance is maintained between the line sensor 46 and an image plane of the document D, which is placed on the platen glass 16 with the image surface of the document D facing downward. The distance is also maintained when the image reading unit 19 moves in the sub-scanning direction along the guide rail 41.

The guide rail 41 is a rod-like member made of a metal having a circular cross section orthogonal to the sub-scanning direction. The guide rail 41 includes a whirl-stop (detent) D-cut portion (restriction portion) 41a formed at one end portion of the guide rail 41 so as to prevent rotation of the guide rail 41 (see FIG. 4). The guide rail 41 is arranged with its longitudinal direction oriented in the sub-scanning direction (right-and-left direction). The D-cut portion 41a is engaged with the wall portion (right wall portion) 17a of the case 17, and the other end portion is arranged in the vicinity of the wall portion (left wall portion) 17b. Furthermore, the guide rail 41 is supported at two different positions on the guide rail 41 in the longitudinal direction by the pair of positioning ribs 42 and 43 described next, and is fixed by the bonding rib 44 arranged between the pair of positioning ribs 42 and 43.

As illustrated in FIGS. 4 to 7, the positioning ribs 42 and 43 are formed into the same shape, and project from the bottom portion 17c of the case 17 in an elongate plate shape. The positioning ribs 42 and 43 have recessed portions 42a and 43a formed at their upper ends, respectively, and upper end edges 42b and 43b are in abutment against an outer peripheral surface 41b of the guide rail 41. A distance between the two upper end edges 42b and a distance between the two upper end edges 43b are set smaller than the diameter of the guide rail 41. Therefore, the upper end edges 42b and 43b are brought into abutment against a lower half portion of the outer peripheral surface 41b of the guide rail 41 obliquely from underneath, and do not hinder the movement of the slider 47 of the image reading unit 19. In this manner, the positioning ribs 42 and 43 support, with the aid of the gravitational force of the guide rail 41, the guide rail 41 at two different positions on the guide rail 41 in the longitudinal direction in a state of being positioned in the lateral direction (direction orthogonal to the longitudinal direction: front-back direction of FIG. 3) and in the vertical direction without hindering the movement of the slider 47.

On the other hand, the bonding rib 44 fixes the guide rail 41 with an adhesive S. The bonding rib 44 is formed between the above-mentioned pair of positioning ribs 42 and 43 so as to project from the bottom portion 17c of the case 17 in an elongate plate shape. The bonding rib 44 is formed below the guide rail 41 so as to project in such a posture that the longitudinal direction of the bonding rib 44 is aligned along the guide rail 41. The bonding rib 44 has a band-like bonding surface 44a as its top surface. A gap G is formed between the bonding surface 44a and a lower portion of the outer peripheral surface 41b of the guide rail 41. That is, the bonding surface 44a is opposed to the guide rail 41 via the gap G. The bonding rib 44 fixes the guide rail 41 with the adhesive S applied (filled) into the gap G. Note that, as illustrated in FIGS. and 5, a recessed portion 50 is formed between the bonding rib 44 and the positioning rib 42 and a recessed portion 51 is formed between the bonding rib 44 and the positioning rib 43. The recessed portions 50 and 51 are formed for the purpose of causing an excess of the adhesive S, which is applied onto the bonding surface 44a of the bonding rib 44, to run off from the bonding surface 44a. That is, the recessed portions 50 and 51 are formed adjacent to the bonding rib 44 in order to collect the adhesive run off from the bonding rib 44.

In this case, it is preferred that the adhesive S has moderate elasticity after curing. The positioning ribs 42 and 43 and the bonding rib 44 described above are molded integrally with the case 17 made from a synthetic resin such as a plastic. On the other hand, the guide rail 41 is generally made of a metal such as stainless steel so as to secure the strength of the guide rail 41. When the members made of different materials such as a synthetic resin and a metal are fixed to each other with the adhesive S, the adhesive S may be released because of a difference in thermal expansion (thermal contraction) between the materials in the event of temperature change. In view of this fact, the adhesive S having elasticity after the curing is used so that the release of the adhesive S may be prevented. Even when the adhesive S has elasticity, however, it is desired that the elasticity fall within such a range that the adhesive S may reliably prevent, after the curing, vibration of the guide rail 41 to be caused by the movement of the image reading unit 19.

Next, a method of attaching (assembling) the guide rail 41 to the case 17 will be described.

The adhesive S is applied onto the bonding surface 44a of the bonding rib 44. The guide rail 41 is held in an inclined posture so that the D-cut portion 41a formed at one end portion of the guide rail 41 is positioned on a lower side, and the D-cut portion 41a is inserted into the right wall portion 17a of the case 17 while keeping the posture of the guide rail 41. At this time, the guide rail 41 is inclined, and is therefore kept out of contact with the adhesive S applied onto the bonding surface 44a.

Then, the guide rail 41 is placed on the pair of positioning ribs 42 and 43 from above as the inclination of the guide rail 41 is reduced gradually, and the D-cut portion 41a is pressed against the right wall portion 17a. Thus, the guide rail 41 is positioned in the longitudinal direction (right-and-left direction of FIG. 3) through the D-cut portion 41a. Furthermore, the guide rail 41 is brought into abutment against the pair of positioning ribs 42 and 43 with the aid of the gravitational force of the guide rail 41, and thus the guide rail 41 is positioned in the horizontal direction (front-back direction of FIG. 3) and the vertical direction, which are orthogonal to the longitudinal direction. Simultaneously with the positioning, the guide rail 41 is brought into contact with the adhesive S applied onto the bonding surface 44a of the bonding rib 44. This state is kept until the adhesive S is cured. After the adhesive S is cured, the guide rail 41 is fixed in the positioned state. Therefore, even when a thin guide rail 41 is used, the vibration caused by the movement of the image reading unit 19 may be prevented.

The image reading apparatus 11 having the above-mentioned structure may achieve the following actions and effects.

Unlike the conventional art, the through-hole for fixing the guide rail 41 is unnecessary. Therefore, even when a thinner guide rail than that of the conventional art is used, the vibration may be suppressed while securing sufficient strength of the guide rail 41.

Furthermore, the through-hole is unnecessary for the guide rail 41, and accordingly the number of processing steps may be reduced.

Furthermore, the guide rail 41 is fixed with the adhesive S, and thus a fastening member configured to fix the guide rail 41 is unnecessary.

Furthermore, the bonding rib 44 is formed along the guide rail 41 so that the long bonding surface 44a may be secured. Thus, the guide rail 41 may be fixed over a long range, with the result that the unnecessary vibration of the guide rail 41 may be suppressed.

Furthermore, the through-hole is unnecessary for the guide rail 41, and the pair of positioning ribs 42 and 43 and the bonding rib 44 may be molded integrally with the case 17. As a result, the structure configured to attach the guide rail 41 to the case 17 may be simplified.

Furthermore, the guide rail 41 may easily be attached (assembled) to the case 17 as described above.

According to the image reading apparatus of the embodiment, the guide rail may be fixed to the fixing portion with the adhesive applied onto the bonding surface of the fixing portion. Therefore, even when the guide rail is thin, the vibration in the lateral direction and the vertical direction, which may be caused by the movement of the image reading unit, may be prevented, with the result that the image reading unit may read an image with high accuracy.

According to the image forming apparatus of the embodiment, the image forming portion may form an image on the sheet with high accuracy based on the image information read by the image reading apparatus with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263075, filed Dec. 19, 2013, which is hereby incorporated by reference herein in its entirety.

What is claimed is:

1. An image reading apparatus, comprising:
    a guide rail extending in a longitudinal direction;
    an image reading unit configured to read an image, the image reading unit including a slider that is configured to slide along the guide rail in a state where the slider contacts the guide rail, the slider sliding along the guide rail when the image reading unit is guided by the guide rail and moved in the longitudinal direction;
    a first portion configured to abut on the guide rail so as to determine a position of the guide rail in a lateral direction, substantially perpendicular to the longitudinal direction, and in a vertical direction, substantially perpendicular to both the longitudinal direction and the lateral direction;
    a second portion configured to abut on the guide rail so as to determine the position of the guide rail in the lateral direction and in the vertical direction, wherein the second portion is provided at a different position from the first portion in the longitudinal direction;
    a third portion provided between the first portion and the second portion in the longitudinal direction, the third portion extending in the longitudinal direction and having a gap with the guide rail; and
    an adhesive applied to the gap, the adhesive contacting the guide rail and the third portion so as to fix the guide rail to the third portion in the longitudinal direction, in the lateral direction, and in the vertical direction,
    wherein a length of the third portion in the longitudinal direction is longer than a length of the first portion in the longitudinal direction and is longer than a length of the second portion in the longitudinal direction.

2. An image reading apparatus according to claim 1, wherein the third portion has a protruding portion and is integrally formed with a holding portion configured to hold a transparent unit, a document to be read by the image reading unit being placed on the transparent unit.

3. An image reading apparatus according to claim 1, wherein the guide rail comprises (i) a guide portion configured to contact the slider to guide a movement of the image reading unit and (ii) a bonding portion which is bonded to the third portion with the adhesive,
    wherein the third portion has a bonding surface opposed to the bonding portion of the guide rail, and
    wherein the bonding surface is formed along the longitudinal direction of the guide rail.

4. An image reading apparatus according to claim 3, wherein the third portion has a recessed portion formed adjacent to the bonding surface in order to collect run off of the adhesive from the bonding surface.

5. An image reading apparatus according to claim 3, wherein the bonding portion is provided below the guide portion in the vertical direction.

6. An image forming apparatus, comprising:
    the image reading apparatus according to claim 1; and
    an image forming portion configured to form an image on a recording material based on image information read by the image reading apparatus.

7. An image reading apparatus according to claim 1, wherein the guide rail includes a guide portion configured to guide the image reading unit by abutting against the slider and abutting portions configured to abut against the first portion and the second portion, the guide portion and the abutting portions being provided at different positions in a circumferential direction of the guide rail.

8. An image reading apparatus according to claim 7, wherein the slider is movable in the longitudinal direction over places at which the abutting portions are provided.

* * * * *